Sept. 8, 1964 L. CLEMENS 3,147,908

KNOCK-DOWN STORAGE BIN

Filed July 11, 1961 4 Sheets-Sheet 1

Inventor:
Ludwig Clemens,
By Elmer D. Marwood,
His Attorney.

Inventor:
Ludwig Clemens,
By [signature]
His Attorney.

Inventor:
Ludwig Clemens,
By [signature], His Attorney.

Sept. 8, 1964 L. CLEMENS 3,147,908

KNOCK-DOWN STORAGE BIN

Filed July 11, 1961 4 Sheets-Sheet 4

Inventor:
Ludwig Clemens,

By [signature], His Attorney.

United States Patent Office 3,147,908
Patented Sept. 8, 1964

3,147,908

KNOCK-DOWN STORAGE BIN

Ludwig Clemens, Wiesbadener Strasse 91, Wiesbaden-Kastel, Germany

Filed July 11, 1961, Ser. No. 123,265
Claims priority, application Germany July 22, 1960
3 Claims. (Cl. 229—23)

The invention relates to knock-down portable storage bins, and relates more particularly to such storage bins which may be stored and transported flat form, but are erectable into storage bin form for the transport and storing of goods.

Bins of this general description are known, but have the disadvantage that they consume a great deal of material and labor in the manufacture.

It is accordingly among the principal objects of the invention to provide a knock-down storage bin which consumes but little material, and is easy to blank and to erect from the blank, resulting in low cost manufacture.

It is another object of the invention to provide such a bin which is highly weather resistant.

It is a still further object of the invention to provide such a bin which is stiff though light in weight.

It is yet another object of the invention to provide such a knock-down storage bin which has reinforcements formed in each corner of two interconnectable parts.

It is a further object of the invention to provide such a knock-down storage bin which is particularly suited for the transport and storing of agricultural products, such as fruit and vegetables.

It is yet another object of the invention to provide such a bin that has a removable lid.

Further objects and advantages of the invention will be set forth in part in the following specification, and in part will be obvious therefrom without being specifically referred to, the same being realized and attained as pointed out in the claims hereof.

With the above and other objects of the invention in view, the invention consists in the novel methods, construction, arrangement and combination of various devices, elements and parts, as set forth in the claims hereof, certain embodiments of the same being illustrated in the accompanying drawings and described in the specification.

The foregoing and other objects of the invention will be best understood from the following description of exemplifications thereof, reference being had to the accompanying drawings, wherein.

Figure 1:
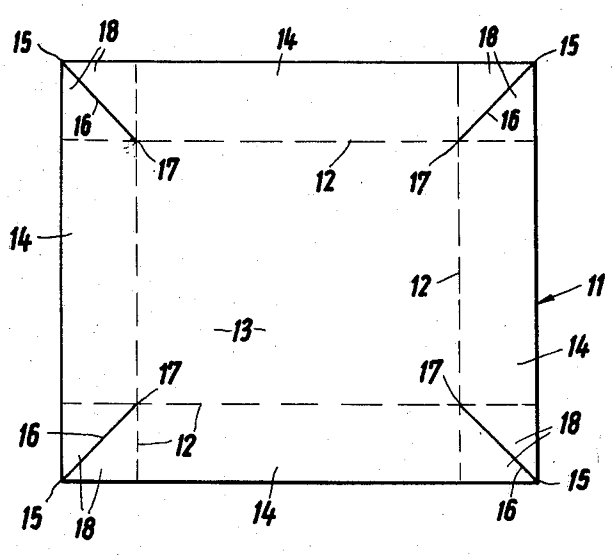
FIG. 1 is a plan view of a blank for a knock-down storage bin, in accordance with an embodiment of the invention.
Figure 2:
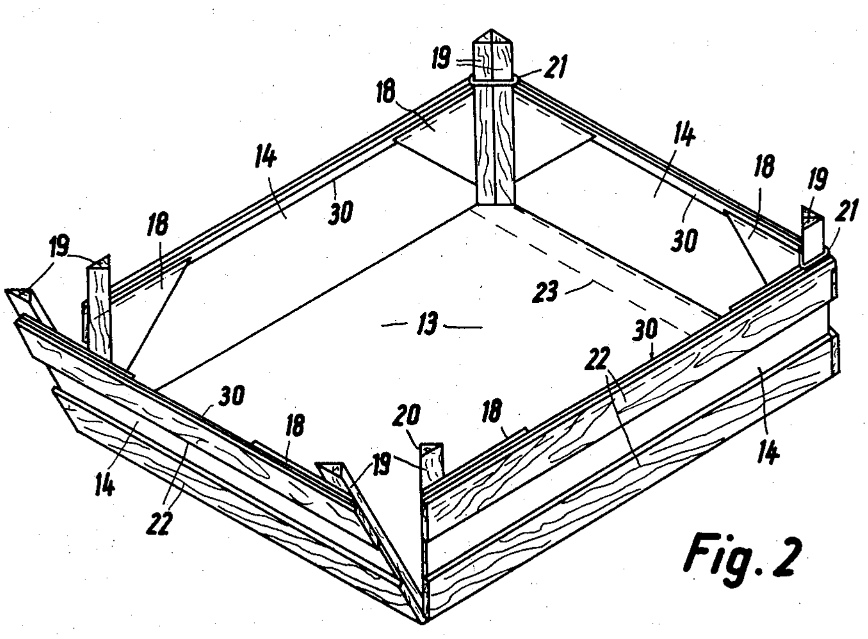
FIG. 2 is a perspective view of an almost completely assembled bin formed from a blank of the type shown in FIG. 1.

In carrying the invention into effect in the embodiments which have been selected for illustration in the accompanying drawings and for description in this specification, and referring now particularly to FIGS. 1 and 2, there is provided a blank 11 from which there may be fashioned the bin of FIG. 2. The blank 11 has a multi-sided contour, for instance a rectangular contour, and has accordingly multiple corners, for instance four corners as shown in FIG. 1.

The blank 11 is composed of a suitable material, for instance of cardboard, paperboard, corrugated paper, plywood, wicker or other wooden band weave, or foil or plastic sheet or plastic foil, or the like. Where the material used is corrugated paper, it may first have been impregnated by spraying, dipping or rolling to increase either its strength or its life, or its resistance to moisture. Where plywood is used, it may be of a type which is made bendable or foldable or pliable at the creases by any well-known suitable process. Lastly, the material may be impregnated cardboard, foil, plywood, or plastic sheet or plastic foil, or the like.

The foregoing listing of material is, it will be observed, intended to be illustrative and not exhaustive.

The blank 11 has four creases 12 which are parallel to the outer edges, and near the corners the creases 12 intersect each other. Each crease 12 defines with its outer edge of the blank 11 a strip, and each strip includes a flap or flap portion 14. The creases 12 surround a base or base portion 13.

At each corner the blank 11 has a cut or incision 16 which substantially bisects the corner and extends from the tip 15 of the corner to the point of intersection 17 of the creases 12 at that corner. A triangular portion 18 is defined on each flap 14 between the cut 16 and a terminal portion of the crease 12 that continues through the width of said flap from the point 17 thereof. The two triangular portions 18 of each flap 14, as best shown in FIG. 2, are folded about the terminal crease portions and lie flat against the flap 14 out of which they have been bent, and are connected to the body of the flap, for instance by gluing or stapling, or the like.

Figure 3:
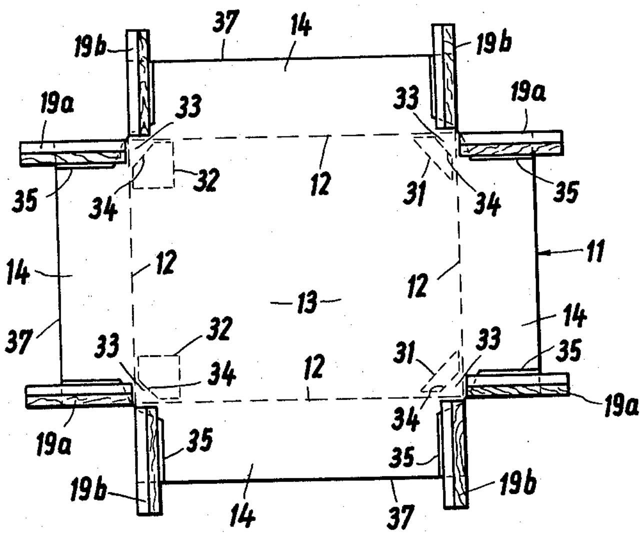
FIG. 3 is a plan view of a knocked down storage bin embodying a modification.
Figure 4:
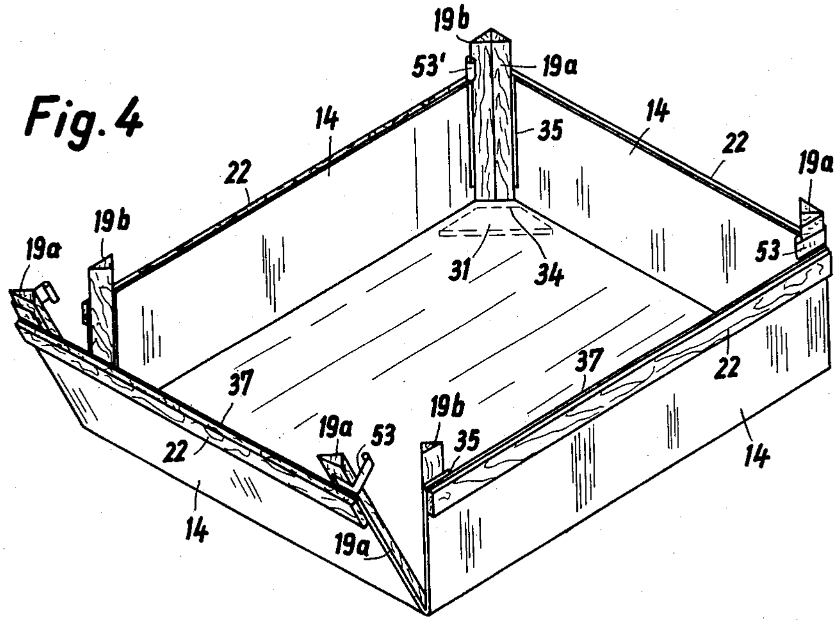
FIG. 4 is a perspective view of the modified storage bin of FIG. 3 showing it almost completely assembled.
Figures 5, 6:
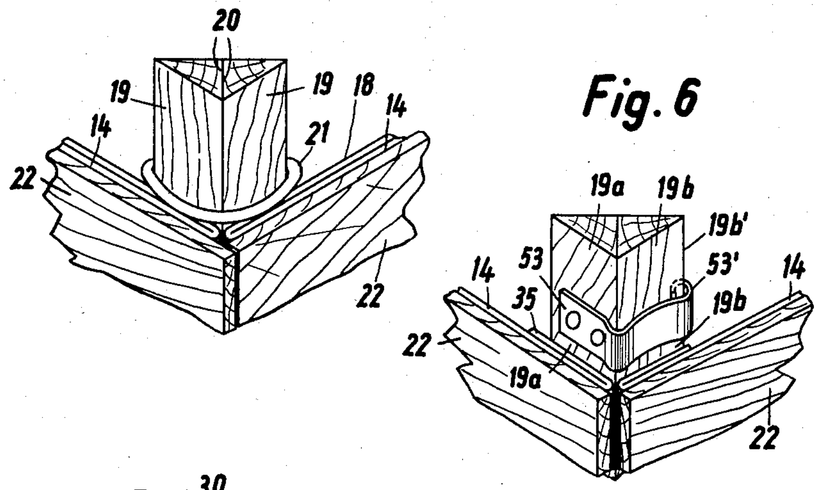
FIG. 5 is a fragmentary large scale perspective view showing a detail of the bin of the first embodiment of FIG. 2.
FIG. 6 is a fragmentary large scale perspective view similar to FIG. 5, but showing a detail of the modified bin of FIG. 4.
Figure 8:
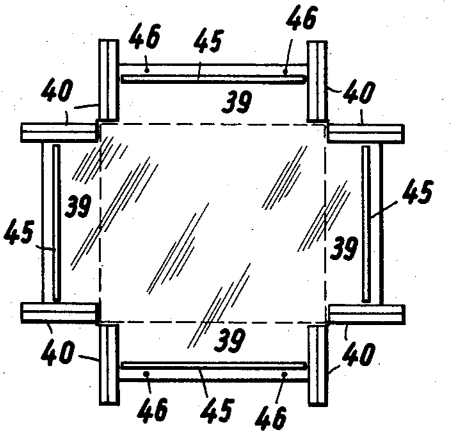
FIG. 8 is a plan view, similar to FIG. 3, but embodying a further modified bin.
Figures 10, 11, 12, 13, 14:
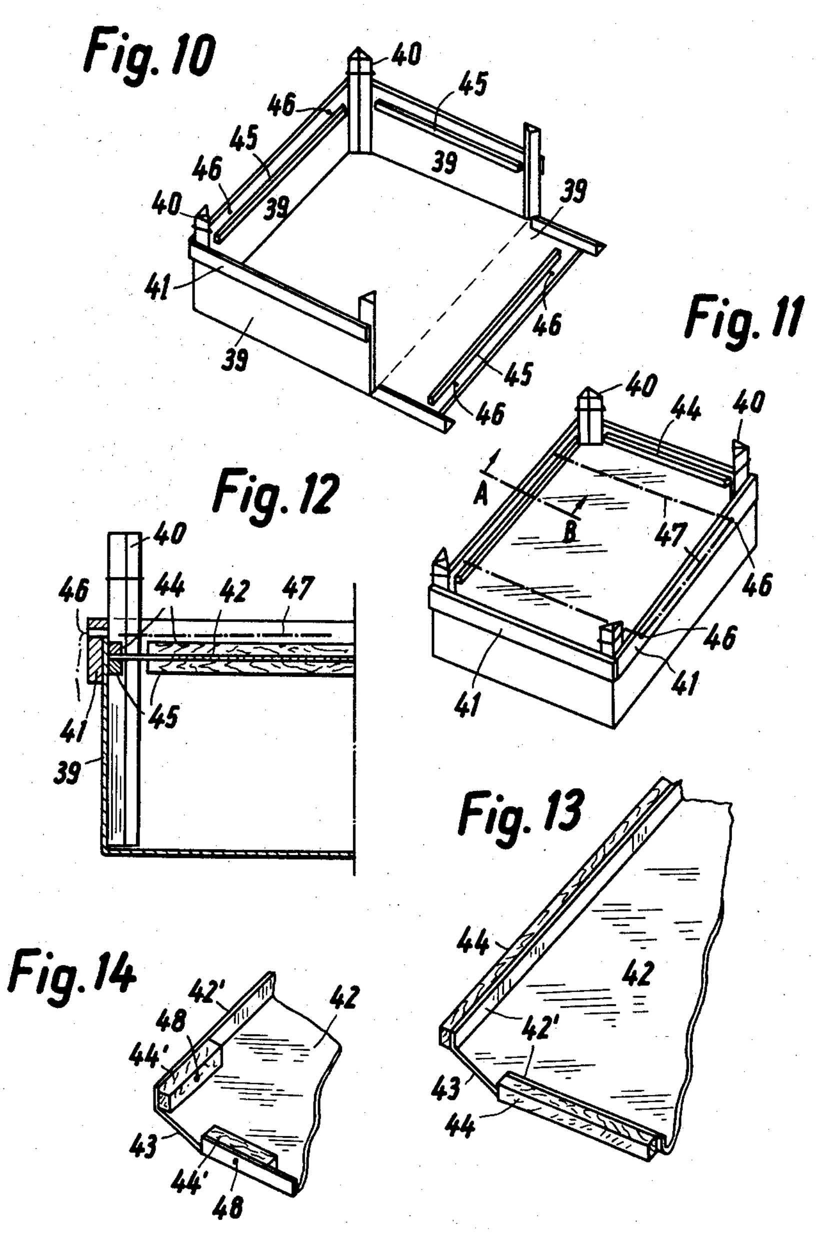
FIG. 10 is a perspective view of the partially completed bin of the modification shown in FIG. 8.
FIG. 11 is a perspective view of the modified bin of FIGS. 8 and 10 with the lid of FIG. 9.
FIG. 12 is a large scale fragmentary sectional view taken on the line A—B of FIG. 11.
FIG. 13 is a fragmentary large scale perspective view of a modified lid.
FIG. 14 is a fragmentary large scale perspective view similar to FIG. 13, but showing a still further modified lid.

In each corner there are provided two reinforcements or reinforcement parts 19 (FIG. 2; or 19*a*, 19*b*, of FIGS. 3 and 4; or 40, of FIGS. 8, 10 and 11). Two reinforcements 19 are connected to each flap in such a manner that each reinforcement is adjacent a corner, and in the erected position the two reinforcements 19 of adjoining flaps 14 in one corner will be positioned close to one another. The reinforcements 19 are made of any suitable rigid material, for instance wood, cardboard, papier-mâché, plastic, metal, or the like. Each reinforcement has a cross section that has at least one right angle, preferably a right angle triangle, so that the two adjoining reinforcements 19 of one corner together will also be of triangular cross section, as best shown in FIGS. 5 and 6.

Each reinforcement 19 is secured to its flap 14, either by gluing or stapling or in any other suitable manner, and each engages the other reinforcement in the corner along an inner surface 20.

When the bin is knocked down and the flaps 14 are flush with the bottom 13, the reinforcements 19 even of the same corner will be separated from each other, as shown in FIGS. 3 and 8. When the bin has been erected by bending upright the flaps 14, however, the reinforcements 19 of each corner will be side-by-side, engaging each other along the inner surface 20, as shown in FIGS. 2 and 4–6.

The pair of reinforcements 19 of each corner serves as a support for the next upper bin, during stacking of the bins. For this purpose, the reinforcements 19 extend upwardly beyond the upper edges 37 (FIG. 4) of the sidewall that is formed by the flaps 14. Following the erection of the bin, the two reinforcements 19 of each corner are interconnected, either permanently or releasably.

In accordance with a preferred form, for instance, they may be connected by an endless hollow triangular ring member 21 (FIG. 5) made of either elastic material, or of inelastic material such as wire, or of other suitable material, or by a cap inserted over the protruding reinforcement ends. In the modification of FIG. 6, on the other hand, there is provided a latch 53 that is riveted to one reinforcement **19*a* and has a resilient arm that carries a hook 53' that engages releasably the other reinforcement 19*b* near the edge 19' thereof. The foregoing preferred embodiment provides for releasable engagement and conversely for restoring of independence from each other of the reinforcements of a corner when the ring 21 (FIG. 5) is lifted off or the hook 53'** (FIG. 6) is disengaged; and provides that the releasable engagement is applied to the upper end of the reinforcements. The reinforcements may furthermore be interconnected releasably by providing two releasably interengaging members, one connected to each reinforcement, for instance snap fasteners, splints, or dowels.

The reinforcements of one corner may, however, be connected permanently instead, for instance by nailing or riveting them together, or by tying them with a steel band or wire, or by cementing them together for instance with the type of cement that is adhesive only when in contact with another likewise cemented surface.

In assembling the storage bin, the operator will bend the flaps 14 upwardly, from the position of alignment (see FIG. 3) with the bottom 13, into the erected position (FIGS. 2, 4). In the erected position the operator will render active the interengagement between the reinforcements of each corner, in accordance with one of the foregoing connecting means.

Reinforcing means may be provided, such as strips 22 (FIGS. 2, 4) or 41 (FIGS. 11, 12) to provide for strengthening and stiffening of the sidewalls 14 adjacent the top edges 37 thereof. These reinforcing means may be composed of wood or cardboard, paper board, or corrugated board, or the like. The strips 22 may be mounted in any suitable manner, for instance by gluing, or by means of staples.

Figure 7:
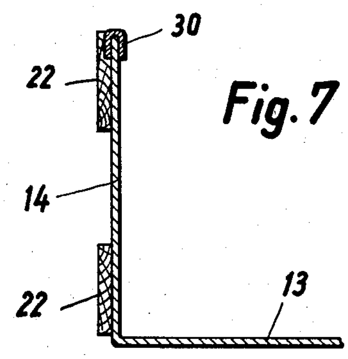
FIG. 7 is a fragmentary large scale vertical sectional view showing portions of the sidewall and bottom of the embodiment of FIG. 2.

Similar reinforcing means may also be applied near the bottom edge of the sidewall, as shown in FIGS. 2 and 7, and may also be applied to the bottom 13 as shown in FIG. 2 in broken lines at 23. These or similar reinforcing means may be applied either to the exterior or to the interior surface of the bottom 13 or flaps 14.

Reinforcing means such as pads 31 (FIGS. 3, 4) or 32 (FIG. 3) may be applied to the underside of the bottom 13 to reinforce the corner portions thereof. The pads 31 or 32 may be glued or otherwise connected to the bottom 13, and provide for an empty triangular space 33 in the corners to receive the upper ends of the reinforcements 19 of the bin stacked below. The aligned upper inner edges of the reinforcements 19 of each corner will thus engage the outer edge 34 of the pads 31 or 32, safeguarding the bins in the stack.

In order to prevent the entry of moisture, either in vapor or liquid form, particularly at the upper edges 37 of the sidewall, there may be provided guards 30 (FIGS. 2 and 7) superposed throughout on the edges 37 to protect them. The guards 30 may be composed of folded strips of water resistant or water repellent flexible material such as impregnated paper, foil or the like that may carry glue on the inner surface.

In the modifications shown in FIGS. 3, 4 and 6, edge portions 35, instead of the triangular portions 18, are bent out of alignment from the flaps 14 and are connected to the flaps 14 by gluing or stapling.

In accordance with the modification of FIGS. 8, 10, 11 and 12, the reinforcements are designated 40, and the flaps 39; the reinforcements 40 are similar to the reinforcements 19 of FIGS. 1–6; the flaps 39 are similar to the preceding flaps 14, and carry external reinforcement strips 41 that correspond to the previous strips 22.

In order to protect the contents of the storage bin against spilling and to aid in keeping out foreign substances such as dust, means are provided to close releasably the bin.

For this purpose, bars 45 are mounted on the inner side of the flaps 39, disposed horizontally when the flaps are in the upright sidewall-forming position, and spaced below the top edge of the sidewall. The horizontal bars 45 serve to support closure means, for instance a lid 42, shown in FIGS. 9 and 11–14. Such a lid 42 may be composed of cardboard, corrugated paper, or other suitable material.

Figure 9:
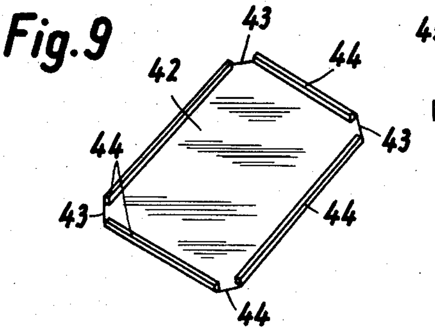
FIG. 9 is a perspective view of a lid for the embodiment shown in FIG. 8.

The lid 42 of the embodiment of FIG. 9 has inclined corner edges 43 to accommodate in the corners the reinforcements 40. Rods 44 (FIGS. 9, 13) are connected to the edges of the lid 42, for instance by stapling, nailing, gluing or clamping, for reinforcement of the lid, particularly to reinforce the lid along the lines of support provided by the bars 45. The rods 44 can be mounted alongside the edges of the lid 42 (FIG. 9). Instead of the rods 44, there may be provided short rods 44' (FIG. 14) which are mounted inside the upturned edge portions 42' of the lid 42. This construction provides a lid 42 of lighter weight.

In order to secure temporarily the lin 42 on the bin, holes 46 may be formed in two opposite flaps 39 of the sidewall and in the strips 41 thereof, at or above the height of the rods 44 of the lid 42 when the lid is emplaced, and flexible tying means such as string or wire 47 (FIGS. 11, 12) may be threaded through the holes 46, and interconnect the opposite flaps 39, and then the ends of the strings or wire 47 may be knotted, and thus restrain removal of the lid 42.

In accordance with a modification, the short rods 44' (FIG. 14) may have apertures 48 that register with the holes 46 when the lid 42 is emplaced. Means may be provided, such as pins or splints or the aforesaid wire, or string, or other suitable well-known means, retractably extending through the registering holes 46 and the apertures 48, to retain removably the lid 42 in place.

I wish it to be understood that I do not desire to be limited to the exact details of construction shown and described, for obvious modifications will occur to a person skilled in the art.

Having thus described the invention, what I claim as new and desire to be secured by Letters Patent, is as follows:

1. A storage bin operable to be stacked with similar storage bins, and being formed of, and operative to be knocked down to, a flat creased piece of stiff impregnated paperboard comprising a bottom wall and side walls integral with the bottom wall, said creases being formed between the bottom wall and the side walls, each side wall being movable about a crease to and from an upright position, two reinforcement rods of triangular cross section secured to each side wall on the interior of the storage bin and movable with the side walls, each reinforcement rod being disposed near an upright edge of the side wall in such a manner that the adjacent reinforcement rods of two adjoining side walls in the upright position complete a two-piece corner post of triangular cross section having its widest surface facing the interior of the storage bin, said posts in the upright position surmounting said bottom wall and projecting upwardly beyond the confines of all the side walls, a rigid reinforcing strip disposed on each side wall on the exterior of the storage bin adjacent the upper edge of the side wall and extending between the two corner posts, and connecting means operable for releasably interconnecting the two reinforcement rods forming a corner post.

2. In a storage bin, as claimed in claim 1, each side wall having on the interior of the storage bin adjacent though below the upper edges a reinforcement bar parallel to the crease of said side wall with the bottom wall, a lid fitting into the open top of the assembled open storage bin and resting on said reinforcement bars and having inclined corner portions providing clearance for said corner posts, holes defined in said rigid reinforcing strips of the side walls, and flexible tie means threaded through said holes interconnecting parts of opposite side walls above said lid.

3. A storage bin operable to be stacked with similar storage bins, and being formed of, and operative to be knocked down to, a flat creased piece of stiff impregnated paperboard comprising a bottom wall and side walls integral with the bottom wall, said creases being formed between the bottom wall and the side walls, each side wall being movable about a crease to and from an upright position, two reinforcement rods of triangular cross-section secured to each sisde wall on the interior of the storage bin and movable with the side walls, each reinforcement rod being disposed near an upright edge of the side wall in such a manner that the adjacent reinforcement rods of two adjoining side walls in the upright position complete a two-piece corner post of triangular cross section having its widest surface facing the interior of the storage bin, said posts in the upright position surmounting said bottom wall and projecting upwardly beyond the confines of all the side walls, a rigid reinforcing strip disposed on each side wall on the exterior of the storage bin adjacent the upper edge of the side wall and extending between the two corner posts, and connecting means operable for releasably interconnecting the two reinforcement rods forming a corner post, said connecting means including an angular latch secured to one reinforcement rod of a post and operable resiliently to engage releasably the other reinforcement rod of the corner post.

References Cited in the file of this patent

UNITED STATES PATENTS

| | | |
|---|---|---|
| 1,048,031 | Bradley | Dec. 24, 1912 |
| 2,074,348 | Stewart | Mar. 23, 1937 |
| 2,276,374 | Derman | Mar. 17, 1942 |
| 2,627,358 | Ponti | Feb. 3, 1953 |
| 2,853,222 | Gallagher | Sept. 23, 1958 |
| 2,961,139 | Nobili | Nov. 22, 1960 |

FOREIGN PATENTS

| | | |
|---|---|---|
| 555,300 | Germany | July 20, 1932 |
| 1,213,709 | France | Nov. 2, 1959 |
| 927,748 | France | May 12, 1947 |
| 1,214,750 | France | Nov. 9, 1959 |
| 245,862 | Switzerland | Aug. 16, 1947 |
| 1,225,836 | France | Feb. 22, 1960 |
| 936,882 | France | Feb. 23, 1948 |
| 1,193,107 | France | Apr. 27, 1959 |
| 205,028 | Australia | Dec. 23, 1954 |